US006302954B1

(12) United States Patent
Lunkenheimer et al.

(10) Patent No.: US 6,302,954 B1
(45) Date of Patent: Oct. 16, 2001

(54) SOLIDIFYING AND HARDENING ACCELERATOR FOR HYDRAULIC BINDERS

(75) Inventors: Rudolf Lunkenheimer, Wackernheim; Johannes Breker, Ludwigshafen; Istvan Potencsik, Mannheim; Horst Altmann, Ludwigshafen; Reinhold Sedelies, Schifferstadt, all of (DE)

(73) Assignee: BK Giulini Chemie GmbH (DE)

( * ) Notice: Subject to any disclaimer, the term of this patent is extended or adjusted under 35 U.S.C. 154(b) by 0 days.

(21) Appl. No.: 09/297,131

(22) PCT Filed: Oct. 25, 1996

(86) PCT No.: PCT/EP96/04647

§ 371 Date: Aug. 20, 1999

§ 102(e) Date: Aug. 20, 1999

(87) PCT Pub. No.: WO98/18740

PCT Pub. Date: May 7, 1998

(51) Int. Cl.$^7$ ..................................................... C04B 24/04
(52) U.S. Cl. ........................... 106/727; 106/819; 106/823
(58) Field of Search ..................................... 106/727, 819, 106/823

(56) References Cited

U.S. PATENT DOCUMENTS 5,560,774 * 10/1996 Bürge et al. ........................ 106/692

FOREIGN PATENT DOCUMENTS

| 3233474 A1 | 3/1984 | (DE) . |
| 266344 A1 | 3/1989 | (DE) . |
| 0076927 A1 | 4/1983 | (EP) . |
| 0657398 A1 | 6/1995 | (EP) . |
| 0670292 A1 | 9/1995 | (EP) . |
| 2471955 | 6/1981 | (FR) . |
| 95/03257 | 2/1995 | (WO) . |

OTHER PUBLICATIONS

Fouche, P.M., ZA 93/05,646A, Dec. 29, 1993, Derwent Abstract 94–083589.

* cited by examiner

*Primary Examiner*—Paul Marcantoni
(74) *Attorney, Agent, or Firm*—Venable; George H. Spencer; Ashley J. Wells

(57) ABSTRACT

A solidification and curing accelerator for hydraulic binders produced by a process including providing a reaction mixture composed of constituents (a) - (e) as follows: (a) at least one of basic aluminum salts which are substantially water insoluble and aluminum hydroxide; (b) at least one of aluminum sulfate which is substantially water soluble and sulfuric acid; (c) at least one of an organic carboxylic acid or mixtures of at least two organic carboxylic acids; (d) aluminum salts of organic carboxylic acids; and (e) at least one organic and inorganic substance selected from the group consisting of sulfates, hydrogen-sulfates, carbonates, hydrogen-carbonates, alkaline earth metal oxides, and alkaline earth metal hydroxides; adding water to the reaction mixture and reacting at a temperature ranging up to 150 ° C. for a time effective to provide a reaction product which is a solution in water.

8 Claims, No Drawings

SOLIDIFYING AND HARDENING ACCELERATOR FOR HYDRAULIC BINDERS

BACKGROUND OF THE INVENTION

1. Field of the Invention

The present invention relates to stable solidification and curing accelerators for hydraulic binders in dissolved form, and to their preparation and use.

2. Description of the Related Art

EP 0 76 927 B1 discloses an alkali metal-free setting accelerator based on aluminium hydroxide. The further constituents of this composition are, according to Claim 1, at least one water-soluble sulphate and/or nitrate and/or formate of alkaline earth metals and transition metals which are added to the main constituent by simple mixing. It is unambiguously stated on page 2, line 55, that this composition is a pulverulent mixture which is added in solid form to the hydraulic binder. Water-swellable compounds are added to the mixture only to avoid excessive dust formation.

DD 266 344 A1 describes cationic aluminium salts obtained by reacting a precipitated aluminium hydroxide with concentrated formic, acetic or nitric acid, which salts are mixed in the form of a powder into the hydraulically setting cement or mortar concerned. The compounds formed by reaction of the aluminium hydroxide with the appropriate acids can be described by a general formula, e.g. Al $(OH)_2$ $R \times H_2O$, Al $(OH)$ $R_2 \times H_2O$ or $AlR_3 \times H_2O$. These aluminium salts contain no sulphate or chloride ions.

FR 2 471 955 describes a process for the accelerated setting of cement which is characterized in that bisulphite-formaldehyde, calcium formate and calcium nitrate in the form of a solution are used as accelerating agent, e.g. see page 3, from line 19, Examples.

Finally, EP 0 657 398 A1 likewise discloses a process for accelerating the setting of hydraulic binders, which is characterized in that the accelerating agent is a mixture containing at least one water-soluble sulphate of a polyvalent cation, in particular of aluminium, and a further water-insoluble component, e.g. calcium sulphoaluminate, calcium aluminate, basic aluminium sulphate and at least one further component. This further component can, according to Claim 24, be a dispersant, an inorganic binder, a fluidizer or a deaerating agent.

The setting accelerators are of particular interest in industry if they can be used in liquid form. Compared with the solid accelerators, mention may be made of essentially their better meterability, the more rapid release of the active substance (s) and naturally the negligible dust or aerosol formation during handling.

The classical liquid, alkaline accelerators, e.g. sodium aluminate and water glass are not only corrosive because of their high pH but also lead to a sometimes drastic decrease in the final strength of concrete because of the high amounts of alkali metal which they introduce.

Newer, liquid accelerators comprise mainly aqueous suspensions of basic aluminium sulphates. However, they are generally not stable to freezing, tend to sediment and display, although they could be employed in liquid form in the wet spraying process, unsatisfactory early strength development and also have only a slight accelerating effect, depending on the type of cement. Other commercially available concentrated aluminium salt solutions, e.g. $Al_2(SO_4)_3$ containing about 8% of $Al_2O_3$ or aluminium triformate solutions containing about 5% of $Al_2O_3$, are unsuitable, at least for the wet spraying process, since they result in an undesirably low compressive strength because of the increased amount of water introduced into the concrete composition and the associated increased water-cement factor.

It is therefore an object of the present invention to provide a concentrated solidification and curing accelerator in aqueous solution form for hydraulic binders, which accelerator does not have the disadvantages of the classical liquid accelerators such as sodium aluminate and water glass and is, in particular, well suited to the wet spraying process.

SUMMARY OF THE INVENTION

This object has surprisingly been able to be achieved by new liquid solidification and curing accelerators for hydraulic binders such as cement, which accelerators are obtainable by a process which is characterized in that the following components Component a: basic aluminium salts and/or aluminium hydroxide Component b: aluminium sulphate and/or sulphuric acid Component c: organic carboxylic acids or mixtures of at least two organic carboxylic acids Component d: aluminium salts of organic carboxylic acids Component e: organic and/or inorganic sulphates and/or hydrogensulphates and/or carbonates and/or hydrogen-carbonates and/or alkaline earth metal oxides and/or alkaline earth metal hydroxides are reacted in water at temperatures up to 150° C. to give a solution, where 1. all components or a selection of the components react with one another so that the molar rations of aluminium to sulphate in the final product are from 0.83 to 13.3 and the molar rations of aluminium to organic carboxylic acid are from 0.67 to 33.3 or 2. all components apart from component e or a selection of the components apart from component e react with one another so that the molar ratios of aluminium to sulphate in the final product are from 0.83 to 13.3 and the molar ratios of aluminium to organic carboxylic acid in the final product are from 0.67 to 33.3 or 3. the component e is subsequently dissolved in the reaction product from Point 2.

As basic aluminium salts, preference is given to using the basic sulphates, carbonates, carbonate sulphates and nitrates and mixtures of at least two of these components.

Suitable organic carboxylic acids are essentially monocarboxylic acids, hydroxycarboxylic acids and dicarboxylic acids, e.g. formic acid, acetic acid, glycolic acid, lactic acid and mixtures thereof.

As inorganic and organic sulphates or hydrogen-sulphates, use is made of the alkaline earth metal salts and/or triethanolamine salts and/or diethanol-amine salts of sulphuric acid. However, the alkali metal salts of sulphuric acid are also used as sulphate or hydrogensulphate.

As carbonates and/or hydrogencarbonates, it is possible to use the alkaline earth metal salts. Alkaline earth metal oxides or alkaline earth metal hydroxides may also be used.

The setting accelerators of the invention can, it required, be used together with other compounds such as setting retardants, fluidizers and rebound-reducing agents.

DESCRIPTION OF THE PREFERRED EMBODIMENT

The following examples illustrate the subject matter of the invention without restricting it:

PREPARATIVE EXAMPLES:

Example 1

675 g of basic aluminium carbonate (17.77% $Al_2O_3$) were slurried in 90 g of 85% strength formic acid and admixed with 324 g of aluminium sulphate (17.5% $Al_2O_3$). Stirring at a temperature of from 50 to 60° C. gave a virtually clear solution after 1.5 hours. The solution is stable for a period of more than 3 months.

Example 2

490 g of basic aluminium sulphate (16.7% $Al_2O_3$) were slurried in 36.9 g of 80% strength lactic acid and admixed with 375 g of aluminium sulphate (17.5% $Al_2O_3$). Stirring at a temperature of from 51 to 72° C. gave a slightly turbid solution after 1.5 hours.

Example 3

500 g of basic aluminium sulphate (17.8% $Al_2O_3$) were admixed with 76 g of oxalic acid dihydrate and 375 g of aluminium sulphate (17.5% $Al_2O_3$). Stirring at a temperature of 75% gave a clear solution after 1 hour. The solution was concentrated to a weight of 846.5 g.

Example 4

101 g of basic aluminium carbonate (19.15% $Al_2O_3$) were slurried in 8.2 kg of water and 15.2 kg of 85% strength formic acid and admixed with 72 kg of aluminium sulphate (17.5% $Al_2O_3$). Stirring at a temperature of from 35 to 80° C. gave a virtually clear solution after 3 hours. The solution is stable for a period of more than 3 months.

Example 5

101 kg of basic aluminium carbonate (19.15% $Al_2O_3$) were slurried in 8.3 kg of water and 14.5 kg of 85% strength formic acid and admixed with 65.1 kg of aluminium sulphate (17.5% $Al_2O_3$). Stirring at a temperature of from 33 to 62° C. gave a virtually clear solution after 4 hours.

Example 6

67.7 g of magnesium sulphate (27.5 [lacuna] MgO) were dissolved in 500 g of the solution from Example 5.

Example 7

105.5 g of aluminium triformate (11.7% Al, 61.3% formic acid) were mixed with 356.3 g of basic aluminium carbonate sulphate (18.4% $Al_2O_3$) and 375 g of aluminium sulphate (17.5% $Al_2O_3$). Stirring at a temperature of 75% gave a slightly turbid solution after 90 minutes.

Comparative Example 1

Dispersion of a basic aluminium carbonate sulphate containing 16.5% of $Al_2O_3$.

Comparative Example 2

Dispersion of a basic aluminium sulphate containing 16% of $Al_2O_3$.

TABLE 1

Effect of the compounds used according to the invention on the setting times

| Accelerator from | Conc. based on Portland cement | Cement | Commencement of setting (sec) | End of setting (sec) |
|---|---|---|---|---|
| Example 1 | 10% | A | 195 | 390 |
| Example 2 | 10% | A | 240 | 450 |
| Example 3 | 10% | A | 240 | 360 |
| Example 4 | 7.3% | B | 75 | 180 |
| Example 5 | 5% | C | 135 | 240 |
| Example 6 | 7.5% | B | 80 | 200 |
| Example 7 | 6.5% | B | 90 | 240 |
| Comparative Example 1 | 5% | A | >500 | n.d. |
| Comparative Example 1 | 10% | A | >500 | n.d. |
| Comparative Example 2 | 5% | A | >500 | n.d |
| Comparative Example 2 | 10% | A | >500 | n.d. |
| Comparative Example 1 | 10% | B | >500 | n.d. |
| Comparative Example 1 | 10% | C | >500 | n.d. |

The determination of the setting times was based on the Vicat method. 290 g of Portland cement and 2.9 g of fluidizer (1%) were used in each case. The W/C value was 0.41. The cement mix was stirred for 30 minutes and then accelerated.

Wet spraying experiments using the setting accelerators of the invention

| Top shot nozzle | |
|---|---|
| Hose diameter: | 65 mm |
| Spraying hose diameter: | 50 mm |
| Spraying hose length: | 5 m |
| Material throughput in kg/min: | 162 |
| Rebound in %: | 3.5 |
| Particle size distribution: | B8 |
| Portland cement C content: in kg/m³: | 425 |
| W/C value: | 0.485 |
| Fluidizer in %: | 1.3 |
| Retardant in %: | 0.1 |
| Accelerator: | from Example 5, 6.6% |
| Early strength: | Kaindl-Meyco method |
| Cured concrete test: | drilled core, diam. 10 cm |
| Slump: | about 50 cm |

TABLE 2

Compressive strengths in $N/mm^2$

| Time | Accelerator from Example 5, 6.6% | Without accelerator |
|---|---|---|
| 1h | 1.4 | — |
| 2h | 2.0 | — |
| 4h | 3.7 | — |
| 6h | 6.9 | — |
| 8h | 9.5 | — |
| 24h | 14.1 | — |
| 2d | 29 | — |
| 7d | 36 | — |
| 28d | 51 | 55 |

All data based on 2 parallel experiments

TABLE 3

Effect of the compounds used according to the
invention on the development of early strength
Early strengths in N/mm² using accelerators from:

| Time (h) | Ex. 4 (5.9%) | Ex. 6 (6.7%) | Ex. 4 (frozen, 5.9%) | Ex. 6 (frozen, 6%) |
|---|---|---|---|---|
| 2 | 1.41 | 1.56 | 1.5 | 1.6 |
| 6 | 4.5 | 5.4 | 4.9 | 6.2 |
| 8 | 5.8 | 7.2 | 6.1 | 8.2 |
| 24 | 17.9 | 21.8 | 19.0 | 22.5 |

The strengths were examined using a method based on DIN 1164, part 7. The following modifications to this method were made:

Aggregate: 0–8 mm
W/C value: 0.55
Fluidizer: 1.5%
Addition of accelerator: 60 min after making up the concrete
Portland cement: 400 kg/m³
(Type B)

What is claimed is:

1. A solidification and curing accelerator for hydraulic binders, produced by a process comprising:
   providing a reaction mixture comprising constituents (a) through (e) as follows:
   (a) at least one of basic aluminium salts which are substantially water insoluble and aluminium hydroxide;
   (b) at least one of aluminum sulfate which is substantially water soluble and sulfuric acid;
   (c) at least one of an organic carboxylic acid or mixtures of at least two organic carboxylic acids;
   (d) aluminum salts of organic carboxylic acids; and
   (e) at least one organic and inorganic substance selected from the group consisting of sulfates, hydrogensulfates, carbonates, hydrogen-carbonates, alkaline earth metal oxides, and alkaline earth metal hydroxides;
   adding water to the reaction mixture and reacting at a temperature ranging up to 150° C. for a time effective to provide a reaction product which is a solution in water and is effective as a solidification and curing accelerator for hydraulic binders,
   wherein the reaction product is characterized by one of (A) or (B) as follows:
   (A) either all constituents or a selection of constituents react with one another so that the reaction product has a molar ratio of aluminum to sulfate ranging from 0.83 to 13.3 and a molar ratio of aluminum to organic carboxylic acid ranging form 0.67 to 33.3 or
   (B) either all constituents except (e) or a selection of constituents except (e) react with one another so that the reaction product has a molar ration of aluminum to sulfate ranging from 0.83 to 13.3 and a molar ration of aluminum to organic carboxylic acid ranging from 0.67 to 33.3, and constituent (e) is dissolved in the reaction product.

2. The solidification and curing accelerator for hydraulic binders according to claim 1, wherein the basic aluminum salts which are substantially water insoluble are selected from the group consisting of basic sulfates, carbonates, carbonate sulfates, nitrates and mixtures thereof.

3. The solidification and curing accelerator for hydraulic binders according to claim 1 or 2, wherein the organic carboxylic acids are selected from the group consisting of monocarboxylic acids, dicarboxyclic acids, and mixtures thereof.

4. The solidification and curing accelerator for hydraulic binders according to any one of claim 1 to 3, wherein the sulfates and hydrogensulfates are selected from the group consisting of alkaline earth metal salts, triethanolamine salts, and diethanolamine salts of sulfuric acid.

5. The solidification and curing accelerator for hydraulic binders according to any one of claim 1 to 4, wherein the carbonates are alkaline earth metal carbonates, and wherein the hydrogencarbonates are alkaline earth metal hydrogencarbonates.

6. The solidification and curing accelerator for hydraulic binders according to any one of claim 1 to 5, wherein the organic carboxylic acids are selected from the group consisting of formic acid, acetic acid, glycolic acid, lactic acid, and mixtures thereof.

7. The solidification and curing accelerator for hydraulic binders according to any one of claim 1 to 6, wherein at least one of the sulfates and hydrogensulfates are alkali metal salts of sulfuric acid.

8. The solidification and curing accelerator for hydraulic binders according to any one of claim 1 to 7, further comprising at least one of a setting retardant, a fluidizer, and a rebound-reducing agent.

* * * * *